United States Patent
Huang et al.

(10) Patent No.: US 10,744,726 B2
(45) Date of Patent: Aug. 18, 2020

(54) ALTERNATING PRESSURE MELT IMPREGNATION DEVICE AND MELT IMPREGNATION METHOD USING THE SAME

(71) Applicant: KINGFA SCI. & TECH. CO., LTD., Guangdong (CN)

(72) Inventors: Xianbo Huang, Guangdong (CN); Wei Xin, Guangdong (CN); Yonghua Li, Guangdong (CN); Chunhua Chen, Guangdong (CN); Dahua Chen, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 211 days.

(21) Appl. No.: 15/856,078

(22) Filed: Dec. 28, 2017

(65) Prior Publication Data
US 2019/0184653 A1    Jun. 20, 2019

(30) Foreign Application Priority Data
Dec. 18, 2017    (CN) .......................... 2017 1 1367963

(51) Int. Cl.
*B29C 70/52*    (2006.01)
*B29B 15/12*    (2006.01)
(Continued)

(52) U.S. Cl.
CPC ............ *B29C 70/523* (2013.01); *B05C 3/125* (2013.01); *B05C 3/132* (2013.01); *B05C 3/152* (2013.01);
(Continued)

(58) Field of Classification Search
CPC ... B29C 70/523; B29C 70/527; B29C 70/528; B29C 70/46; B29C 70/52; B29B 15/122;
(Continued)

(56) References Cited

U.S. PATENT DOCUMENTS 4,785,985 A * 11/1988 Hurtgen ................ B65H 23/24
                                                      242/615.11
4,894,190 A *  1/1990 Kromrey ................ B29C 35/06
                                                      264/347
(Continued)

FOREIGN PATENT DOCUMENTS

CN        203752370 U   *  8/2014
CN        104827686        8/2015
(Continued)

*Primary Examiner* — Laura Edwards
(74) *Attorney, Agent, or Firm* — JCIPRNET

(57) ABSTRACT

An alternating pressure melt impregnation device and a melt impregnation method, including having a resin melt squirted from each resin melt runner on an upper die and a lower die of a melt injection area, and thus the squirted resin melt is enable to be squirted directly on an upper surface and a lower surface of a continuous fiber bundle which is entering into an impregnation chamber. Impregnation and infiltration for both surfaces of the continuous fiber bundle are primarily completed by a squirted pressure. The resin melt inside the impregnation chamber flows to a decompression chambers at both sides of the impregnation chamber. When the resin melt flows to a throttle plate, a re-impregnation for the continuous fiber bundle is realized. Then the pressure is decreased and a section of the resin melt is enlarged and a radial flow is generated due to the Barus effect.

16 Claims, 1 Drawing Sheet

(51) Int. Cl.
*B05C 3/12* (2006.01)
*B05C 3/132* (2006.01)
*B05C 3/152* (2006.01)
*B29K 101/12* (2006.01)

(52) U.S. Cl.
CPC .......... B29B 15/122 (2013.01); B29C 70/527 (2013.01); B29C 70/528 (2013.01); B29K 2101/12 (2013.01)

(58) Field of Classification Search
CPC ....... B29K 2101/12; B05C 3/12; B05C 3/125; B05C 3/132; B05C 3/15; B05C 3/152; D01D 5/06; D01D 5/0046
USPC .......................................................... 425/70
See application file for complete search history.

(56) References Cited

U.S. PATENT DOCUMENTS

| 7,011,714 | B2* | 3/2006 | Schuler | .................. | C23G 3/023 |
| | | | | | 134/15 |
| 2014/0212650 | A1* | 7/2014 | Johnson | ................ | B29C 70/523 |
| | | | | | 428/300.1 |

FOREIGN PATENT DOCUMENTS

| CN | 105058817 | 11/2015 |
| CN | 106113317 | 11/2016 |

* cited by examiner

ALTERNATING PRESSURE MELT IMPREGNATION DEVICE AND MELT IMPREGNATION METHOD USING THE SAME

CROSS-REFERENCE TO RELATED APPLICATION

This application claims the priority benefit of China application serial no. 201711367963.5, filed on Dec. 18, 2017. The entirety of the above-mentioned patent application is hereby incorporated by reference herein and made a part of this specification.

TECHNICAL FIELD

The present invention relates to an alternating pressure melt impregnation device and a melt impregnation method, and specifically relates to a melt impregnation device and a melt impregnation method for a continuous fiber-reinforced thermoplastic resin composite material.

BACKGROUND

Continuous fiber-reinforced thermoplastic resin composite material is a composite material using an impregnation device to impregnate and reinforce a continuous fiber with a molten resin. Compared with a short fiber-reinforced thermoplastic resin composite material, the continuous fiber-reinforced thermoplastic resin composite material has advantages such as a high strength, a good impact resistance and a stable dimension, and thus has extensive application in fields such as automobile, aerospace electronics and electrical appliances, mechanical equipment, weaponry industry, construction equipment, furniture, gymnastic apparatus and the like.

In a process of melt impregnation, a flow of a resin melt in a fiber bundle takes place both in an axial direction and a radial direction of the fiber, similarly regarding as a fluid flowing in a porous medium, according to the Darcy law:

$$\mu = \frac{dx}{dt} = \frac{k\Delta P}{\eta \Delta x}$$

wherein, $\mu$ is an permeation rate, $k$ is an permeation coefficient, $\Delta P$ is a pressure drop that the fluid acts on the porous medium, $\eta$ is a fluid viscosity, and $\Delta x$ is a melt flow distance. It can be known that increasing a melt pressure, reducing a thickness of the fiber bundle and decreasing a melt viscosity can increase an impregnation rate.

For example, CN106113317A discloses an apparatus for a continuous carbon fiber melt impregnating a thermoplastic polymer. An interval between an upper die and a lower die of the impregnation mold forms a melt pool. Between the upper die and the lower die, curved surfaces matching with each other are provided, and three sets of powered roller pair are also provided. A tension roller is provided between the roller pair. Squeezing a resin melt by the roller pair provides the resin melt with an impregnating pressure. Also CN105058817A discloses an apparatus for a continuous long fiber reinforcing a thermoplastic resin sheet material. Gear sets meshing with each other are provided above and below the fiber bundle, to enhance the flow of the melt on the fiber bundle in each direction. Additionally, CN104827686A discloses an impregnation apparatus for plant fiber and a method thereof. A plurality of compression roller sets of which a tension can be adjusted are used to squeeze the impregnated fiber, in order to provide an impregnating pressure to the impregnation of the resin melt. The three patent applications disclosed above can achieve a relatively ideal impregnating effect in the case of a low drawing speed and a low concentration of the resin melt. However, when the continuous fiber goes through these narrow impregnation channels with a curved shape or a wave shape, since a relatively large flow velocity difference exists inside the resin melt, a velocity gradient of the resin melt would form a shearing field. When the impregnation is performed in a condition of high drawing speed, a broken yarn is caused easily. When a viscosity of the resin melt is high, the broken yarn would further be aggravated enormously. Besides, since a relatively large number of rotating rollers or gears present inside the impregnation area, a complicated structure of equipment and difficult cleaning and maintenance are caused. In the case of the broken yarn in the fiber bundle, the fiber bundle is easy to enwind the rotating rollers or gears, aggravating the broken yarn.

SUMMARY OF THE INVENTION

The present invention is to provide an alternating pressure melt impregnation device with a simple structure, a good impregnating effect and few broken yarns, and to provide a melt impregnation method with a high impregnation rate and a high production stability.

An alternating pressure melt impregnation device according to the present invention includes a fiber pre-dispersion area for heating and dispersing a continuous fiber bundle, and a melt injection area for impregnating the continuous fiber bundle; a plurality of throttle plates are alternately provided at a filament-input end and a filament-output end of the melt injection area respectively, the adjacent throttle plates enclose and form a decompression chamber, at least one decompression chamber exists, and each throttle plate is provided with a filament-moving hole for the continuous fiber bundle going through; and the melt injection area includes an upper die and a lower die, an interval exists between the upper die and the lower die, the interval forms an impregnation chamber for a resin melt flowing in, and the upper die and the lower die are each provided with a plurality of resin melt runners connected with the impregnation chamber.

A melt impregnation method using the alternating pressure melt impregnation device to impregnate a continuous fiber bundle according to the present invention includes steps as follows:

1) introducing a single or multiple continuous fiber bundles to a fiber pre-dispersion area, making the continuous fiber bundle successively wind each tension roller in the fiber pre-dispersion area, and preheating and dispersing the continuous fiber bundle;

2) injecting a resin melt into each resin melt runner on an upper die and a lower die of a melt injection area, making the resin melt be squirted into an impregnation chamber from each resin melt runner, and in the meantime the resin melt in the impregnation chamber flowing into a decompression chamber from filament-moving holes on throttle plates at both sides of the impregnation chamber;

3) continuously drawing the continuous fiber bundle, making the fiber bundle enters into the decompression chamber from a filament-moving hole on the first throttle plate at a filament-input end of the melt injection area for a first impregnation, then exits the decompression chamber via a filament-moving hole on the tail throttle plate and enters into the impregnation chamber of the melt injection area, the resin melt runner continuously squirting the resin melt, and making the resin melt be squirted to a surface of the continuous fiber bundle for impregnation; and 4) then drawing the continuous fiber bundle into the decompression chamber through out of the filament-moving hole on the first throttle plate at the filament-input end of the melt injection area, and the continuous fiber bundle passing through the filament-moving hole on the tail throttle plate to complete the impregnation process.

In the alternating pressure melt impregnation device and the melt impregnation method according to the present invention, the resin melt is squirted from each resin melt runner on the upper die and the lower die of the melt injection area, and thus the squirted resin melt is enable to be squirted directly on an upper surface and a lower surface of the continuous fiber bundle which is entering into the impregnation chamber. Impregnation and infiltration for both surfaces of the continuous fiber bundle are primarily completed by a squirted pressure. As the resin melt inside the impregnation chamber flows to the decompression chambers at both sides of the impregnation chamber, perturbation in different directions such as forward, backward, radial and slant is generated, resulting in a varied direction of the resin melt. When the resin melt flows to the throttle plate, a resistance of the throttle plate leads to an increasing pressure of the resin melt inside the impregnation chamber, which prompts the resin melt to break through a surface tension of the continuous fiber bundle and realizes a re-impregnation for the continuous fiber bundle. Then when the resin melt is squirted to the decompression chamber from the filament-moving hole on the throttle plate, the pressure is decreased. After the resin melt enters into the decompression chamber by a relatively small filament-moving hole, a section of the resin melt is enlarged and a radial flow is generated due to the Barus effect, which further strengthens a uniform distribution inside the continuous fiber bundle of the resin melt inside the decompression chamber, and achieves an object of complete cladding and infiltration. Besides, the decompression chamber can provide a space as required when the resin melt expands. Increasing a number of the decompression chamber is advantageous to increase or maintain a pressure of the melt injection area. A drawing process of the continuous fiber bundle always remains a straight and flat state instead of a curved impregnation path, and thus a velocity gradient of the resin melt would not form an overlarge shearing field. When the impregnation is performed in a condition of a high drawing speed, or even in a condition of a high resin melt viscosity, no broken yarn would take place. Through an effect of an alternating pressure, the continuous fiber bundle achieves a balanced impregnating effect, and usage of a rotating roller or a gear to increase an impregnating pressure is avoided, and thus the broken yarn caused by a friction of the continuous fiber bundle is further avoided. Additionally, since the rotating roller or the gear does not exist in the melt injection area, a structure is simpler and the maintenance is more convenient, without accumulation of winding or broken yarns. Besides, due to few broken yarns and good impregnating effect in the high drawing speed, an impregnation rate can be enormously increased and a production stability is high.

DETAILED DESCRIPTION OF THE PREFERRED EMBODIMENT

Figure 2:
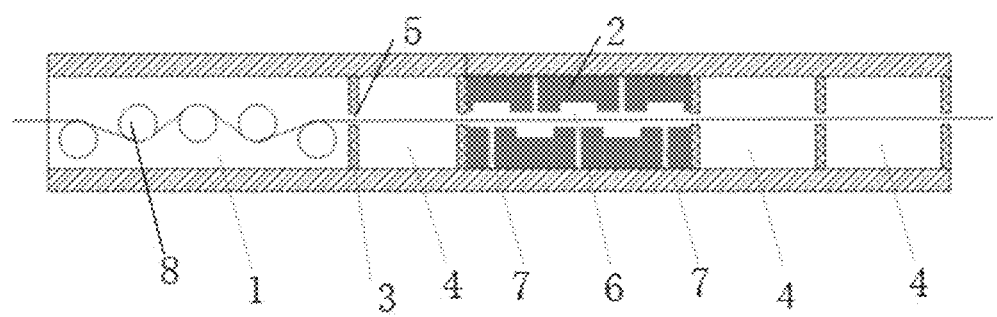
FIG. 2 is a structural diagram of the present invention.

An alternating pressure melt impregnation device, shown as FIG. 2, includes a fiber pre-dispersion area 1 for heating and dispersing a continuous fiber bundle, and a melt injection area 2 for impregnating the continuous fiber bundle. A plurality of throttle plates 3 are alternately provided at a filament-input end and a filament-output end of the melt injection area 2, respectively. The adjacent throttle plates 3 enclose and form a decompression chamber 4. At least one decompression chamber 4 exists, for example one, two, three, four or five, etc. Each throttle plate 3 is provided with a filament-moving hole 5 for the continuous fiber bundle going through. The melt injection area 2 comprises an upper die and a lower die. An interval exists between the upper die and the lower die, and the interval forms an impregnation chamber 6 for a resin melt flowing in. The upper die and the lower die are each provided with a plurality of resin melt runners 7, for example one, two, three, four, five or six, etc., connected with the impregnation chamber 6.

The resin melt runner 7 is perpendicular to a moving direction of the continuous fiber bundle, leading to a higher pressure of a squirted resin melt.

Each resin melt runner 7 of the upper die and each resin melt runner 7 of the lower die are in a symmetrical arrangement, in such case corresponding to increasing an opportunity of multiple throttling and pressurizing; or each resin melt runner 7 of the upper die and each resin melt runner 7 of the lower die are in a staggered arrangement, and in such case the resin melt flows with an S shape along the continuous fiber bundle, which may enhance a balance of the impregnation.

A vertical interval between an outlet plane of the resin melt runner 7 on the upper die and an outlet plane of the resin melt runner 7 on the lower die is 2 mm-50 mm, for example 2 mm, 3 mm, 4 mm, 5 mm, 7 mm, 9 mm, 13 mm, 15 mm, 18 mm, 20 mm, 21 mm, 25 mm, 30 mm, 36 mm, 38 mm, 40 mm, 43 mm, 45 mm or 50 mm, etc., preferably 3 mm-20 mm.

A number of the resin melt runner 7 on the upper die and a number of the resin melt runner 7 on the lower die are 1-10 respectively, for example one, two, three, four, five, six, seven, eight, nine or ten.

A diameter at an outlet of the resin melt runner 7 is 0.5 mm-10 mm, for example 0.5 mm, 1 mm, 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm or 10 mm, etc., preferably 1 mm-8 mm. The outlet of the resin melt runner 7 in the above range of diameter enables a faster melt-squirted speed and a stronger impact effect on the continuous fiber bundle, which are advantageous to enhance an impregnating effect.

An outlet end of the resin melt runner 7 is a flared outlet, a round outlet or an inverted cone outlet.

A number of the decompression chamber 4 at the filament-input end of the melt injection area 2 is 1-5, for example one, two, three, four or five. A number of the decompression chamber 4 at the filament-output end of the melt injection area 2 is 1-10, for example one, two, three, four, five, six, seven, eight, nine or ten. In the premise of effectively maintaining or increasing a pressure of the melt injection area 2, the melt impregnation device is simplified.

The throttle plate 3 has a thickness of 2 mm-10 mm, for example 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm or 10 mm, etc., preferably 3 mm-8 mm. The throttle plate 3 in this range of thickness enables a larger pressure drop and a higher impregnating pressure when the resin melt goes through, which are advantageous to enhance the impregnating effect.

The filament-moving hole 5 on the throttle plate 3 is round, oval or rectangle, etc.

When the filament-moving hole 5 is round, a hole diameter is 2 mm-10 mm, for example 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm or 10 mm, etc., preferably 3 mm-8 mm. The filament-moving hole 5 in this range of diameter enables a more obvious throttling effect and a higher impregnating pressure, which are advantageous to enhance the impregnating effect.

The fiber pre-dispersion area 1 comprises at least two tension roller sets arranged front and rear, each tension roller set consists of two tension rollers 8 arranged front and rear, and an electromagnetic heating apparatus is provided on each tension roller 8. The continuous fiber bundle successively winds the tension roller 8, and the continuous fiber bundle is dispersed and preheated by a tension effect of the tension roller 8 and a heating effect of the electromagnetic heating apparatus, guaranteeing a more balanced and more sufficient impregnating effect subsequent.

A diameter of the tension roller 8 is 5 mm-150 mm, for example 5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 115 mm, 120 mm, 125 mm, 130 mm, 135 mm, 140 mm, 145 mm or 150 mm, etc. A distance between shafts of the adjacent tension rollers 8 is 10 mm-500 mm, for example 10 mm, 30 mm, 50 mm, 70 mm, 90 mm, 110 mm, 130 mm, 150 mm, 180 mm, 200 mm, 220 mm, 250 mm, 280 mm, 310 mm, 350 mm, 390 mm, 430 mm, 450 mm, 480 mm or 500 mm, etc.

A tail of the decompression chamber 4 at the filament-output end of the melt injection area 2 is further connected with at least one calender roller set, for example one, two, three, four or five, etc. Each calender roller set comprises two rotating rollers arranged longitudinally and symmetrically. When the continuous fiber bundle passes by the calender roller set, the two rotating rollers arranged longitudinally and symmetrically would adjust an amount of a molten resin on the continuous fiber bundle.

A melt impregnation method using the alternating pressure melt impregnation device to impregnate a continuous fiber bundle, includes steps as follows: (1) introducing a single or multiple continuous fiber bundles to a fiber pre-dispersion area 1, making the continuous fiber bundle successively wind each tension roller 8 in the fiber pre-dispersion area 1, and preheating and dispersing the continuous fiber bundle; (2) injecting a resin melt into each resin melt runner 7 on an upper die and a lower die of a melt injection area 2, making the resin melt be squirted into an impregnation chamber 6 from each resin melt runner 7, and in the meantime the resin melt in the impregnation chamber 6 flowing into a decompression chamber 4 from filament-moving holes 5 on throttle plates 3 at both sides of the impregnation chamber 6; (3) continuously drawing the continuous fiber bundle, making the fiber bundle enters into the decompression chamber 4 from a filament-moving hole 5 on the first throttle plate 3 at a filament-input end of the melt injection area 2 for a first impregnation, then exits the decompression chamber 4 via a filament-moving hole 5 on the tail throttle plate 3 and enters into the impregnation chamber 6 of the melt injection area 2, the resin melt runner 7 continuously squirting the resin melt, and making the resin melt be squirted to a surface of the continuous fiber bundle for impregnation; and (4) then drawing the continuous fiber bundle into the decompression chamber 4 through out of the filament-moving hole 5 on the first throttle plate 3 at the filament-input end of the melt injection area 2, and the continuous fiber bundle passing through the filament-moving hole 5 on the tail throttle plate 3 to complete the impregnation process.

In step (1), a temperature for preheating the continuous fiber bundle is 50° C.-350° C., for example 50° C., 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., 300° C., 310° C., 320° C., 330° C., 340° C. or 350° C., etc.

Directional indications related in the present invention are only used to explain a relative position relationship among each component when the melt impregnation device is in a condition as FIG. 2. If a specific condition changes, the directional indication changes correspondingly.

The present invention will be further described below by specific implementations. Following embodiments are preferred implementations of the present invention, but the implementation of the present invention is not limited by following embodiments.

Embodiment 1

The above-described alternating pressure melt impregnation device was used to impregnate the continuous fiber bundle by the above-described melt impregnation method. Particularly, the fiber pre-dispersion area 1 comprised two tension roller sets arranged front and rear. A diameter of the tension roller 8 in each tension roller set was 50 mm, a distance between shafts of two tension rollers 8 in each tension roller set was 200 mm, and a temperature for preheating was 200° C. The upper die was provided with two resin melt runners 7, and the lower die was provided with three resin melt runners 7. Each resin melt runner 7 of the upper die and each resin melt runner 7 of the lower die were in a staggered arrangement. A vertical interval between an outlet plane of the resin melt runner 7 on the upper die and an outlet plane of the resin melt runner 7 on the lower die was 50 mm, and a diameter at an outlet of the resin melt runner 7 was 10 mm. An outlet end of the resin melt runner 7 was an inverted cone outlet. There was one decompression chamber 4 at the filament-input end of the melt injection area 2, and there were two decompression chambers 4 at the filament-output end of the melt injection area 2. The throttle plate 3 has a thickness of 2 mm, and the filament-moving hole 5 on the throttle plate 3 was round, with a hole diameter of 10 mm. The tail of the decompression chamber 4 at the filament-output end of the melt injection area 2 was connected with one calender roller set.

A drawing speed under a circumstance without a broken yarn was tested as 60 m/min via a tachometer.

Comparative Example 1

Figure 1:
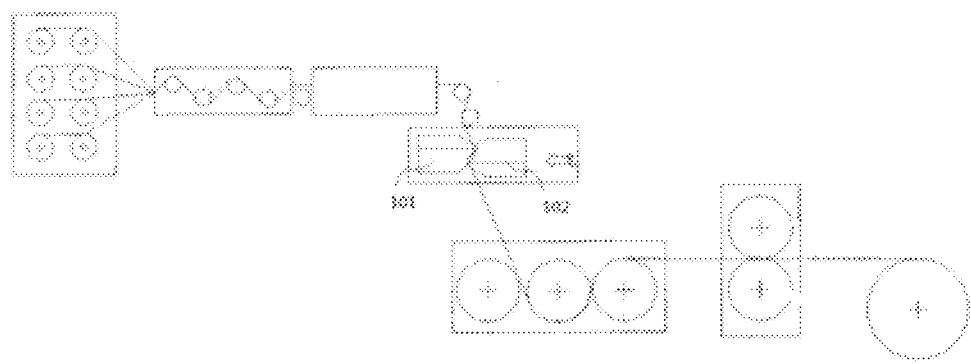
FIG. 1 is a structural view of the prior art.

As shown in FIG. 1, a continuous fiber was introduced from a continuous fiber roller on a creel and unfolded. After successively passing by a tension adjusting device, an electrostatic eliminating device, a preheating device and a tension adjusting device, a preheated continuous fiber band was obtained. The preheated continuous fiber band was directed into a stagger double-extrusion die set that can open and close for pre-impregnation. The pre-impregnated continuous fiber band was directed into an impregnating calender roller set for impregnation, followed by being cooled and sized through a cooling roll-in device, and finally was directed into a drawing windup device for winding and formation. A continuous fiber-reinforced thermoplastic composite material prepreg tape was obtained. The preheated continuous fiber band was directed into the stagger double-extrusion die set that can open and close. The stagger double-extrusion die set that can open and close included an extrusion die 101, an extrusion die 102 and a track motion device. The continuous fiber band was in contact with the extrusion die 101 and generated an infiltration pressure that was perpendicular to a fiber band plane, making a molten thermoplastic resin pre-impregnate a side of the continuous fiber band. The other side of the continuous fiber band was in contact with the extrusion die 102 and generated the same infiltration pressure, making the molten thermoplastic resin re-impregnate the other side of the continuous fiber band.

The drawing speed under the circumstance without the broken yarn was tested as 20 m/min via the tachometer.

It can be seen from the comparison among Embodiment 1 and Comparative Example 1 that under the circumstance without the broken yarn, the drawing speed of the melt impregnation device of the present invention was faster, leading to a high production stability and a high efficiency.

Embodiment 2

The vertical interval between the outlet plane of the resin melt runner 7 on the upper die and the outlet plane of the resin melt runner 7 on the lower die was changed to 2 mm. Other details were the same as Embodiment 1. The drawing speed under the circumstance without the broken yarn was tested as 65 m/min via the tachometer.

Embodiment 3

The vertical interval between the outlet plane of the resin melt runner 7 on the upper die and the outlet plane of the resin melt runner 7 on the lower die was changed to 20 mm, and the diameter at the outlet of each resin melt runner 7 was 5 mm. Other details were the same as Embodiment 1. The drawing speed under the circumstance without the broken yarn was tested as 67 m/min via the tachometer.

Embodiment 4

The vertical interval between the outlet plane of the resin melt runner 7 on the upper die and the outlet plane of the resin melt runner 7 on the lower die was changed to 12 mm, the diameter at the outlet of each resin melt runner 7 was 0.5 mm, and the thickness of the throttle plate 3 was 10 mm. Other details were the same as Embodiment 1. The drawing speed under the circumstance without the broken yarn was tested as 69 m/min via the tachometer.

Embodiment 5

The vertical interval between the outlet plane of the resin melt runner 7 on the upper die and the outlet plane of the resin melt runner 7 on the lower die was changed to 3 mm, the diameter at the outlet of each resin melt runner 7 was 0.5 mm, the thickness of the throttle plate 3 was 3 mm, and the hole diameter of the filament-moving hole 5 on the throttle plate 3 was 2 mm. Other details were the same as Embodiment 1. The drawing speed under the circumstance without the broken yarn was tested as 72 m/min via the tachometer.

Embodiment 6

The vertical interval between the outlet plane of the resin melt runner 7 on the upper die and the outlet plane of the resin melt runner 7 on the lower die was changed to 3 mm, the diameter at the outlet of each resin melt runner 7 was 0.5 mm, the thickness of the throttle plate 3 was 5 mm, and the hole diameter of the filament-moving hole 5 on the throttle plate 3 was 8 mm. Other details were the same as Embodiment 1. The drawing speed under the circumstance without the broken yarn was tested as 75 m/min via the tachometer.

Embodiment 7

The vertical interval between the outlet plane of the resin melt runner 7 on the upper die and the outlet plane of the resin melt runner 7 on the lower die was changed to 3 mm, the diameter at the outlet of each resin melt runner 7 was 0.5 mm, the thickness of the throttle plate 3 was 8 mm, and the hole diameter of the filament-moving hole 5 on the throttle plate 3 was 5 mm. Other details were the same as Embodiment 1. The drawing speed under the circumstance without the broken yarn was tested as 77 m/min via the tachometer.

Embodiment 8

The vertical interval between the outlet plane of the resin melt runner 7 on the upper die and the outlet plane of the resin melt runner 7 on the lower die was changed to 3 mm, the diameter at the outlet of each resin melt runner 7 was 0.5 mm, the thickness of the throttle plate 3 was 8 mm, and the hole diameter of the filament-moving hole 5 on the throttle plate 3 was 3 mm. Other details were the same as Embodiment 1. The drawing speed under the circumstance without the broken yarn was tested as 80 m/min via the tachometer.

What is claimed is:

1. An alternating pressure melt impregnation device, comprising:
    a fiber pre-dispersion area for heating and dispersing a continuous fiber bundle, comprising at least two tension roller sets and an electromagnetic heating apparatus,
    a creel for introducing the continuous fiber bundle to the fiber pre-dispersion area,
    a melt injection area for impregnating the continuous fiber bundle,
    a drawing windup device for pulling the fiber bundle through the impregnation device,
    wherein a plurality of throttle plates are alternately provided at a filament-input end and a filament-output end of the melt injection area respectively, the adjacent throttle plates enclose and form a decompression chamber, at least one decompression chamber exists at the filament-input end of the melt injection area, at least one decompression chamber exists at the filament-output end of the melt injection area, and each throttle plate is provided with a filament-moving hole for the continuous fiber bundle going through; and the melt injection area comprises an upper die and a lower die, a space exists between the upper die and the lower die, the space forms an impregnation chamber for a resin melt flowing in, and the upper die and the lower die are each provided with a plurality of resin melt runners connected with the impregnation chamber, wherein the at least two tension roller sets are arranged front and rear, each tension roller set consists of two tension rollers arranged front and rear, and the electromagnetic heating apparatus is provided on each tension roller, wherein each resin melt runner is perpendicular to a moving direction of the continuous fiber bundle, wherein each resin melt runner of the upper die and each resin melt runner of the lower die are in a staggered arrangement.

2. The alternating pressure melt impregnation device according to claim 1, wherein a vertical space between an outlet plane of the resin melt runner on the upper die and an outlet plane of the resin melt runner on the lower die is 2 mm-50 mm.

3. The alternating pressure melt impregnation device according to claim 1, wherein a number of the resin melt runner on the upper die and a number of the resin melt runner on the lower die are 1-10, respectively.

4. The alternating pressure melt impregnation device according to claim 1, wherein a diameter at an outlet of the resin melt runner is 0.5 mm-10 mm.

5. The alternating pressure melt impregnation device according to claim 4, wherein an outlet end of the resin melt runner is a flared outlet, a round outlet or an inverted cone outlet.

6. The alternating pressure melt impregnation device according to claim 1, wherein a number of the at least one decompression chamber at the filament-input end of the melt injection area is 1-5, and a number of the at least one decompression chamber at the filament-output end of the melt injection area is 1-10.

7. The alternating pressure melt impregnation device according to claim 6, wherein each throttle plate has a thickness of 2 mm-10 mm.

8. The alternating pressure melt impregnation device according to claim 7, wherein a filament-moving hole on each the throttle plate is round, oval or rectangle.

9. The alternating pressure melt impregnation device according to claim 8, wherein when the filament-moving hole (5) is round, a hole diameter is 2 mm-10 mm.

10. The alternating pressure melt impregnation device according to claim 1, wherein a diameter of each tension roller is 5 mm-150 mm.

11. The alternating pressure melt impregnation device according to claim 1, wherein a distance between shafts of the adjacent tension rollers is 10 mm-500 mm.

12. The alternating pressure melt impregnation device according to claim 1, wherein a tail of the decompression chamber at the filament-output end of the melt injection area is further connected with at least one calender roller set, and each calender roller set comprises two rotating rollers arranged longitudinally and symmetrically.

13. The alternating pressure melt impregnation device according to claim 2, wherein the vertical space between the outlet plane of the resin melt runner on the upper die and the outlet plane of the resin melt runner on the lower die is 3 mm-20 mm.

14. The alternating pressure melt impregnation device according to claim 4, wherein the diameter at the outlet of the resin melt runner is 1 mm-8 mm.

15. The alternating pressure melt impregnation device according to claim 7, wherein each of the throttle plate has the thickness of 3 mm-8 mm.

16. The alternating pressure melt impregnation device according to claim 9, wherein when the filament-moving hole (5) is round, the hole diameter is 3 mm-8 mm.

* * * * *